(12) United States Patent
Gurunathan et al.

(10) Patent No.: US 11,074,564 B2
(45) Date of Patent: Jul. 27, 2021

(54) COMPUTER SYSTEM AND COMPUTER-IMPLEMENTED METHOD FOR PROCESSING A PAYMENT TRANSACTION AT A POINT-OF-SALE TERMINAL

(71) Applicant: MASTERCARD INTERNATIONAL INCORPORATED, Purchase, NY (US)

(72) Inventors: Arunmurthy Gurunathan, Maharashtra (IN); Ravi Pareek, Maharashtra (IN); Ganesh Shinde, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 74 days.

(21) Appl. No.: 16/156,327

(22) Filed: Oct. 10, 2018

(65) Prior Publication Data

US 2019/0188670 A1 Jun. 20, 2019

(30) Foreign Application Priority Data

Dec. 19, 2017 (SG) .............................. 10201710547T

(51) Int. Cl.
*G06Q 20/20* (2012.01)
*G06Q 20/40* (2012.01)
*G06Q 20/10* (2012.01)
*G06Q 20/34* (2012.01)
*G07F 9/00* (2006.01)
*G07G 1/00* (2006.01)

(52) U.S. Cl.
CPC ......... *G06Q 20/202* (2013.01); *G06Q 20/102* (2013.01); *G06Q 20/356* (2013.01); *G06Q 20/3567* (2013.01); *G06Q 20/40* (2013.01); *G07F 9/006* (2013.01); *G07G 1/0009* (2013.01)

(58) Field of Classification Search
CPC ........ G06Q 20/20; G06Q 2/20; G06Q 20/202; G06Q 20/40; G06Q 20/102; G06Q 20/3567; G07F 9/006; G07G 20/356
USPC .......................................................... 705/21
See application file for complete search history.

(56) References Cited

U.S. PATENT DOCUMENTS

2002/0152179 A1* 10/2002 Racov .................... G06Q 20/04
                                                         705/67
2019/0034906 A1*  1/2019 Barrett ................... G06Q 20/28

OTHER PUBLICATIONS

Fast Payments, Nov. 2016, Bank for International Settlements, pp. 2, 6 and 24.*

* cited by examiner

*Primary Examiner* — Nathan A Mitchell
*Assistant Examiner* — Denisse Y Ortiz Roman

(57) ABSTRACT

A payment network server for processing a payment transaction at a point-of-sale terminal is described. The server comprises a transaction module, a query module and a transfer module. The transaction module is configured to: (i) receive a payment transaction request comprising at least transaction details and a fund transfer indicator, the transaction details comprise at least a customer identifier, a merchant identifier, and a payment amount, the fund transfer indicator indicating that the payment transaction is to be processed by fund transfer; and (ii) transmit a payment transaction response indicating if the payment transaction is approved or refused to proceed.

20 Claims, 11 Drawing Sheets

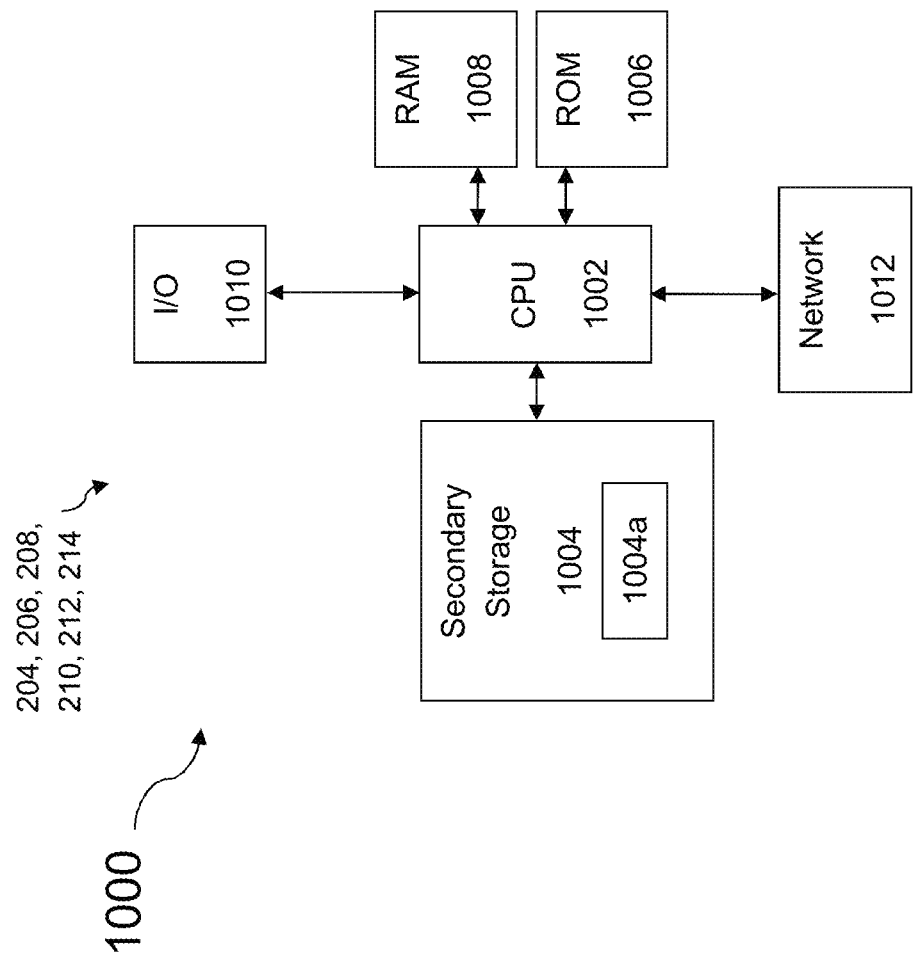

COMPUTER SYSTEM AND COMPUTER-IMPLEMENTED METHOD FOR PROCESSING A PAYMENT TRANSACTION AT A POINT-OF-SALE TERMINAL

CROSS REFERENCE TO THE RELATED APPLICATION

This application claims priority to Singapore Application No. 10201710547T, filed Dec. 19, 2017, entitled "Computer System and Computer-Implemented Method for Processing a Payment Transaction at a Point-Of-Sale Terminal", the entirety of which is incorporated herein by reference.

FIELD OF THE INVENTION

The present invention relates to a computer system and computer-implemented method for processing a payment transaction. In particular, the invention relates to processing a payment transaction at a point-of-sale (POS) terminal.

BACKGROUND OF THE INVENTION

Cashless payments are gaining popularity over recent years due to many conveniences they provide. In particular, cashless payments reduce a need for a customer to carry cash and a need for a merchant to maintain enough change/coins to provide to customers in exchange for larger notes etc.

At present, most cashless payment transactions are conducted over point-of-sale (POS) terminals. However, current POS terminals accept only card-based payments which tend to use either a single-message or a dual-message system for processing the transactions. A single-message transaction is where withdrawal of funds from e.g. a customer account to a merchant account is done in one operation, where a request for authorisation sent to an issuer institution associated with the customer account constitutes a confirmation of the transaction simultaneously. An example of a single-message transaction is a debit card payment transaction where the customer is required to enter a personal identification number (PIN) which is verified in real-time by the issuer institution. In contrast, a dual-message transaction is processed in two steps. A first step involves requesting authorisation for the transaction by checking if there exists available funds in the customer account, while a second step involves settling the transaction with the merchant account via the issuer institution.

Nonetheless, in either of these systems, at least one authorisation process is required which often results in a long processing time (e.g. up to 30 seconds) which is detrimental to a customer payment experience.

It is therefore an aim of the present invention to provide a computer system and computer-implemented method to ameliorate some or all of the aforementioned problems.

SUMMARY OF THE INVENTION

In accordance with a first aspect of the present invention, there is provided a payment network server for processing a payment transaction at a point-of-sale (POS) terminal. The server comprising:
a transaction module configured to:
receive, from the POS terminal via an acquirer server, a payment transaction request comprising at least transaction details and a fund transfer indicator, the transaction details comprise at least a customer identifier, a merchant identifier, and a payment amount, the fund transfer indicator indicating that the payment transaction is to be processed by fund transfer; and
transmit, to the POS terminal via the acquirer server, a payment transaction response indicating if the payment transaction is approved or refused to proceed;
a query module configured to:
query a payment network database to determine if the customer identifier is associated with a customer mandate and if the merchant identifier is associated with a merchant mandate, the customer mandate being associated with a customer transfer instruction for transferring funds from a customer account to an intermediate account and the merchant mandate being associated with a merchant transfer instruction for transferring funds from the intermediate account to a merchant account; and
retrieve the customer mandate and the merchant mandate if it is determined that the customer identifier and the merchant identifier is associated with the customer mandate and the merchant mandate respectively; and
a transfer module configured to:
request an electronic payment system to perform fund transfers using the customer mandate, the merchant mandate and the payment amount, so as to transfer the payment amount from the customer account to the intermediate account, and from the intermediate account to the merchant account.

Embodiments of the invention therefore provide a payment network server that can be used for processing payment transactions at point-of-sale (POS) terminals using fund transfer. In particular, the payment network server of the present invention uses an intermediate account and an electronic payment system to facilitate direct fund transfers between a customer account and the intermediate account and between the intermediate account and the merchant account, thereby improving user experience by decreasing processing time of payment transactions at the POS terminal. Cumulatively, this may also lead to shorter waiting time in queues if most customers take advantage of making payment using direct fund transfers. In effect, embodiments of the invention may increase productivity since less time is expended waiting which can otherwise be channelled to other activities.

Moreover, embodiments of the present invention advantageously utilise present infrastructures for payment transactions so that minimal costs will be incurred to implement the above. The primary set-up required is to maintain records of customer mandates and merchant mandates, which map to customer identifiers and merchant identifiers respectively, at the payment network server. This can be easily implemented using existing memory storages, servers and/or databases.

Furthermore, by administering an intermediate account to facilitate fund transfer between customer accounts and merchant accounts, the payment network server advantageously provides a platform for carrying out payment transactions between a plurality of customers and a plurality of merchants centrally, thereby effectively minimising administrative costs. In other words, the intermediate account associated with the payment network server serves as a central account where funds from customer accounts can be received and in turn be transmitted to appropriate merchant accounts. In this way, customer accounts do not have to be linked to each merchant account individually and vice versa as each of the customer accounts or merchant accounts is merely required to register with the payment network server for carrying out payment transactions using fund transfer.

The payment network server may comprise a registration module where the registration module is configured to:
receive, from a customer electronic device, a customer registration request to register the customer account for processing payment transactions using fund transfer, the customer registration request comprising at least the customer identifier; and
create the customer mandate associated with the customer identifier; and
wherein the transfer module is further configured to:
register the customer mandate with the electronic payment system; and
store, at the payment network database, the customer mandate.

The payment network server may comprise a tokenisation module where the tokenisation module is configured to:
receive, from the customer electronic device, customer account details associated with the customer account, the customer account details comprising at least a customer account number, the customer account number identifying an issuer server associated with the customer account;
substitute the customer account details with a customer token; and
transmit the customer token to the customer electronic device;
wherein the registration module is further configured to:
associate the customer mandate with the customer token;
wherein the customer token is used as a customer identifier for processing the payment transaction.

Tokenisation of customer account details replaces sensitive data with unique identification symbols that retain all the essential information about the data. These additional steps advantageously minimise fraudulent transactions by improving security during transmission of these sensitive data.

The registration module may be configured to:
receive, from a merchant associated with the merchant account, a merchant registration request to register the merchant account for processing payment transactions using fund transfer, the merchant registration request comprising the merchant identifier; and
create the merchant mandate associated with the merchant identifier; and
wherein the transfer module is further configured to:
register the merchant mandate with the electronic payment system; and
store, at the payment network database, the merchant mandate.

The transaction module may be configured to notify the customer electronic device of a result of the payment transaction request.

The electronic payment system may be a payment system that facilitates real-time payment.

In accordance with a second aspect of the present invention, there is provided a POS terminal for use with the preceding payment network server, the POS terminal comprises:
a POS input module configured to:
receive a transaction request comprising at least the transaction details; and
receive a mode of payment instruction, the mode of payment instruction indicating that the payment transaction is to be completed using fund transfer;
a POS transaction module configured to:
generate the fund transfer indicator; and
a POS communication module configured to:
transmit to the acquirer server, the payment transaction request comprising the transaction details and the fund transfer indicator; and
receive, from the acquirer server, the payment transaction response.

The POS terminal may comprise a POS registration module configured to transmit, to the payment network server the merchant registration request to register the merchant account for processing payment transactions using fund transfer.

In accordance with a third aspect of the present invention, there is provided an electronic payment system for processing a payment transaction at a point-of-sale (POS) terminal, the system comprising:
a system transaction module configured to:
receive, from a payment network server, a fund transfer request comprising at least a customer mandate, a merchant mandate and a payment amount;
a system query module configured to:
query an electronic payment database to determine if the customer mandate is associated with a customer transfer instruction for transferring funds from a customer account to an intermediate account associated with a payment network and if the merchant mandate is associated with a merchant transfer instruction for transferring funds from the intermediate account to a merchant account; and
retrieve the customer transfer instruction and the merchant transfer instruction if it is determined that the customer mandate is associated with the customer transfer instruction and the merchant mandate is associated with the merchant transfer instruction respectively; and a system transfer module configured to:
transfer an incoming fund associated with the payment amount from the customer account to the intermediate account; and
transfer an outgoing fund associated with the payment amount from the intermediate account to the merchant account.

The electronic payment system may comprise a system registration module where the system registration module is configured to:
receive, from the payment network server, a customer transfer registration request for creating the customer transfer instruction for transferring funds from the customer account to the intermediate account;
receive, from the payment network server, a merchant transfer registration request for creating the merchant transfer instruction for transferring funds from the intermediate account to the merchant account;
transmit, to the payment network server, a customer transfer registration response indicating if the customer transfer instruction is created; and
transmit, to the payment network server, a merchant transfer registration response indicating if the merchant transfer instruction is created; and
wherein the system transaction module is further configured to:
create the customer transfer instruction associated with the customer mandate; and
create the merchant transfer instruction associated with the merchant mandate.

In accordance with a fourth aspect of the present invention, there is provided a computer-implemented network for processing a payment transaction at a point-of-sale (POS) terminal, the network comprising:
a payment network server, the payment network server comprising:

a transaction module configured to:
  receive, from the POS terminal via an acquirer server, a payment transaction request comprising at least transaction details and a fund transfer indicator, the transaction details comprise at least a customer identifier, a merchant identifier, and a payment amount, the fund transfer indicator indicating that the payment transaction is to be processed by fund transfer; and
  transmit, to the POS terminal via the acquirer server, a payment transaction response indicating if the payment transaction is approved or refused to proceed;
a query module configured to:
  query a payment network database to determine if the customer identifier is associated with a customer mandate and if the merchant identifier is associated with a merchant mandate, the customer mandate being associated with a customer transfer instruction for transferring funds from a customer account to an intermediate account and the merchant mandate being associated with a merchant transfer instruction for transferring funds from the intermediate account to a merchant account; and
  retrieve the customer mandate and the merchant mandate if it is determined that the customer identifier and the merchant identifier is associated with the customer mandate and the merchant mandate respectively; and
a transfer module configured to:
  request an electronic payment system to perform fund transfers using the customer mandate, the merchant mandate and the payment amount, so as to transfer the payment amount from the customer account to the intermediate account, and from the intermediate account to the merchant account; and
an electronic payment system, the electronic payment system comprising:
a system transaction module configured to:
receive, from the payment network server, a fund transfer request comprising the customer mandate, the merchant mandate and the payment amount;
a system query module configured to:
  query an electronic payment database to determine if the customer mandate is associated with the customer transfer instruction and if the merchant mandate is associated with the merchant transfer instruction; and
  retrieve the customer transfer instruction and the merchant transfer instruction if it is determined that the customer mandate is associated with the customer transfer instruction and the merchant mandate is associated with the merchant transfer instruction respectively; and
a system transfer module configured to:
  transfer an incoming fund associated with the payment amount from the customer account to the intermediate account; and
  transfer an outgoing fund associated with the payment amount from the intermediate account to the merchant account.

In accordance with a fifth aspect of the present invention, there is provided a computer-implemented method for processing a payment transaction at a point-of-sale (POS) terminal, the method comprising:
receiving, from the POS terminal via an acquirer server, a payment transaction request comprising at least transaction details and a fund transfer indicator, the transaction details comprise at least a customer identifier, a merchant identifier, and a payment amount, the fund transfer indicator indicating that the payment transaction is to be processed by fund transfer;
querying a payment network database to determine if the customer identifier is associated with a customer mandate and if the merchant identifier is associated with a merchant mandate, the customer mandate being associated with a customer transfer instruction for transferring funds from a customer account to an intermediate account and the merchant mandate being associated with a merchant transfer instruction for transferring funds from the intermediate account to a merchant account;
retrieving the customer mandate and the merchant mandate if it is determined that the customer identifier and the merchant identifier is associated with the customer mandate and the merchant mandate respectively;
requesting an electronic payment system to perform fund transfers using the customer mandate, the merchant mandate and the payment amount, so as to transfer the payment amount from the customer account to the intermediate account, and from the intermediate account to the merchant account; and
transmitting, to the POS terminal via the acquirer server, a payment transaction response indicating if the payment transaction is approved or refused to proceed.

The method may comprise:
receiving, from a customer electronic device, a customer registration request to register the customer account for processing payment transactions using fund transfer, the customer registration request comprising at least the customer identifier; and
creating the customer mandate associated with the customer identifier; and
registering the customer mandate with the electronic payment system; and
storing, at the payment network database, the customer mandate.

The method may comprise:
receiving, from the customer electronic device, customer account details associated with the customer account, the customer account details comprising at least a customer account number, the customer account number identifying an issuer server associated with the customer account;
substituting the customer account details with a customer token;
transmitting the customer token to the customer electronic device; and
associating the customer mandate with the customer token;
wherein the customer token is used as a customer identifier for processing the payment transaction.

The method may comprise:
receiving, from a merchant associated with the merchant account, a merchant registration request to register the merchant account for processing payment transactions using fund transfer, the merchant registration request comprising the merchant identifier;
creating the merchant mandate, the merchant mandate associated with the merchant identifier;
registering the merchant mandate with the electronic payment system; and
storing, at the payment network database, the merchant mandate.

The method may comprise notifying the customer electronic device of a result of the payment transaction request.

The intermediate account may be associated with the payment network server.

Transferring funds from the customer account to the intermediate account and transferring funds from the intermediate account to the merchant account may be carried out within 10 seconds, 20 seconds, 30 seconds, 1 minute, 5 minutes, 10 minutes, 20 minutes, 30 minutes, 1 hour, 2 hours, 3 hours, 6 hours, 12 hours or 1 day from the time the payment transaction request is received. However, it may not be necessary for a customer to wait at a POS terminal for the funds to be received in the merchant account. The payment transaction response may be transmitted to the POS terminal as soon as the customer mandate and the merchant mandate are retrieved and this process may be performed significantly quicker than known authorisation processes for payment transactions.

In accordance with a sixth aspect of the present invention, a non-transitory computer-readable medium having stored thereon program instructions for causing at least one processor to perform the preceding method.

Embodiments of the present invention aims to provide a new and useful computer system and computer-implemented method for carrying out payment transactions using fund transfer.

BRIEF DESCRIPTION OF THE DRAWINGS

Non-limiting embodiments of the invention will now be described for the sake of example only, with reference to the following drawings in which:

FIG. 10 shows schematically a hardware structure of a server which may be used in the computerised network of FIG. 2 to implement a method in accordance with an embodiment of the invention;

DETAILED DESCRIPTION OF THE EMBODIMENT

As used in this document, the term "financial account" refers to any payment account which may hold funds such as a saving account, a current account, a checking account or any account associated with a credit card, a debit card, a prepaid card, a charge card, a membership card, a promotional card, a frequent flyer card, an identification card, a prepaid card, a gift card, and/or any other account associated with a payment device that may hold payment account information, such as personal electronic devices, Smartphones, personal digital assistants (PDAs), key fobs, transponder devices, near field communication (NFC)-enabled devices, and/or computers. The term "electronic wallet" refers to an electronic financial account which should be construed accordingly.

Note that the term "institution" is used here in a sense which is not necessarily limited to organizations which are legally constituted as banks, since in some jurisdictions other organizations may be permitted to maintain financial accounts such as payment card accounts. An institution may therefore be one of the following: a bank, a financial technology company, a telecommunication company, or a financial institution.

As used in this application, the terms "component," "module," "system," "apparatus," "interface," or the like are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component/module. One or more components/modules may reside within a process and/or thread of execution and a component/module may be localized on one computer and/or distributed between two or more computers.

Furthermore, the claimed subject matter may be implemented as a method, an apparatus, or an article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Figure 1:
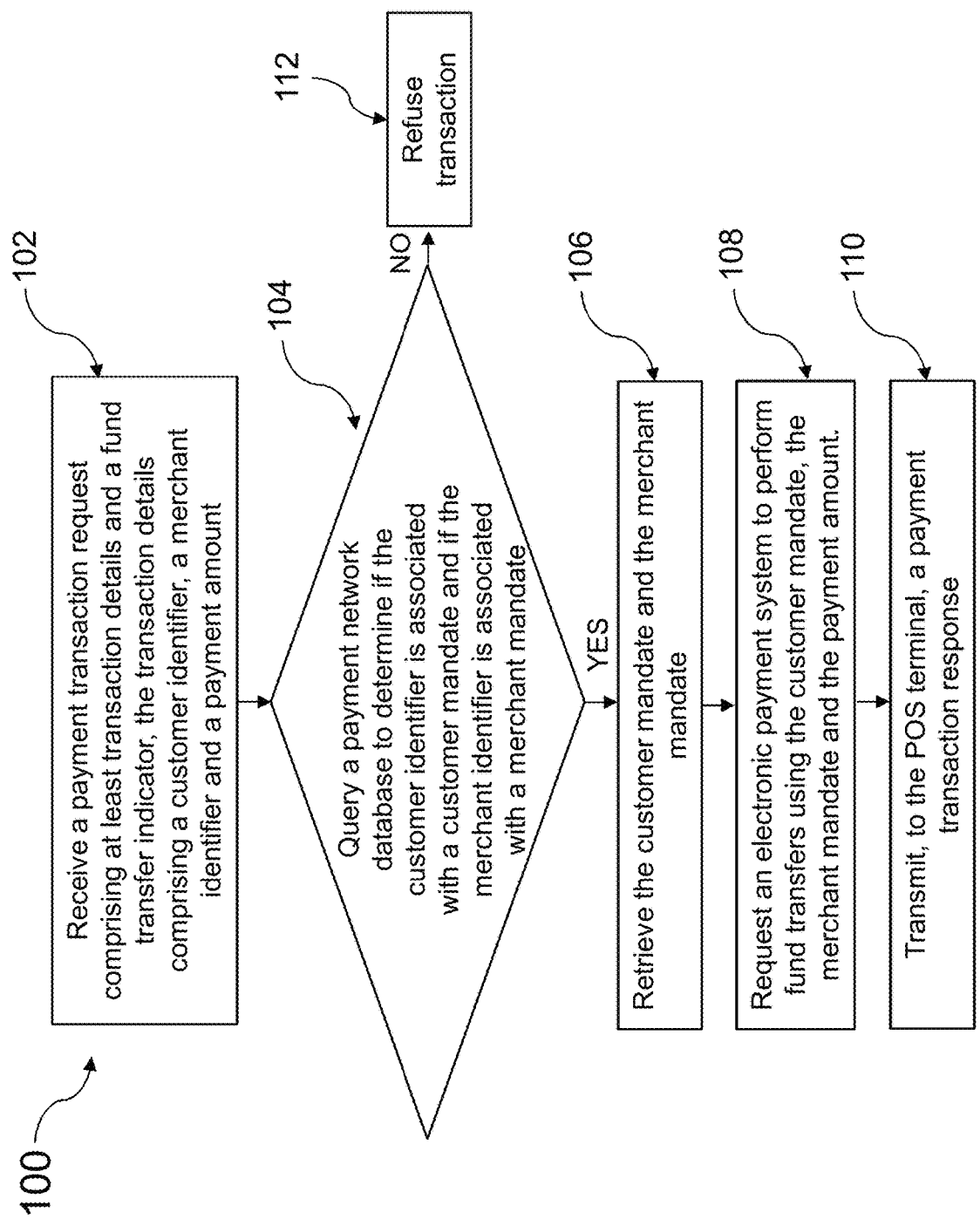
FIG. 1 shows steps of a computer-implemented method which may be performed by a payment network server in accordance with a first embodiment of the invention.

FIG. 1 shows a computer-implemented method 100 which may be performed by a payment network server for processing a payment transaction using fund transfer at a point-of-sale (POS) terminal in accordance with a first embodiment of the present invention.

In particular, the payment network server of the computer-implemented method 100 is configured to:
a) in a step 102, receive, from the POS terminal via an acquirer server, a payment transaction request comprising at least transaction details and a fund transfer indicator, the transaction details comprise at least a customer identifier, a merchant identifier, and a payment amount, the fund transfer indicator indicating that the payment transaction is to be processed by fund transfer;

b) in a step 104, query a payment network database to determine if the customer identifier is associated with a customer mandate and if the merchant identifier is associated with a merchant mandate, the customer mandate being associated with a customer transfer instruction for transferring funds from a customer account to an intermediate account and the merchant mandate being associated with a merchant transfer instruction for transferring funds from the intermediate account to a merchant account;

c) in a step 106, retrieve the customer mandate and the merchant mandate if it is determined that the customer identifier and the merchant identifier is associated with the customer mandate and the merchant mandate respectively;

d) in a step 108, request an electronic payment system to perform fund transfers using the customer mandate, the merchant mandate and the payment amount, so as to transfer the payment amount from the customer account to the intermediate account, and from the intermediate account to the merchant account; and e) in a step 110, transmit, to the POS terminal via the acquirer server, a payment transaction response indicating if the payment transaction is approved or refused to proceed.

If it is determined that the customer identifier is not associated with a customer mandate or if the merchant identifier is not associated with a merchant mandate, the payment transaction will be refused in a step 112. In this case, the payment transaction may be reinitiated by a customer using another form of payment or another customer identifier.

The payment transaction may be approved if the customer identifier is associated with a customer mandate and the merchant identifier is associated with a merchant mandate.

FIG. 1 thus provides a computer-implemented method 100 which advantageously allows processing of a payment transaction at a POS terminal by way of direct fund transfer, thereby improving user experience by decreasing processing time of the payment transaction. Cumulatively, this will lead to shorter waiting time in queues if customers take advantage of making payment using such fund transfers. In effect, embodiments of the invention may increase productivity since less time is used in waiting which can otherwise be channelled to other activities.

Moreover, the above method 100 advantageously utilises present infrastructures for payment transactions so that minimal costs will be incurred to implement the method 100. The primary set-up required is to maintain, at the payment network server, records of customer mandates and merchant mandates which map to customer identifiers and merchant identifiers respectively. This can be easily implemented using existing memory storages, servers and/or databases.

Furthermore, by administering an intermediate account to facilitate fund transfer between customer accounts and merchant accounts, the payment network server provides a platform for carrying out payment transactions between a plurality of customers and a plurality of merchants centrally, thereby effectively administering the method 100 with minimal administrative costs. In other words, the intermediate account associated with the payment network server serves as a central account where funds from customer accounts can be received and in turn be transmitted to appropriate merchant accounts. In this way, customer accounts do not have to be linked to each merchant account individually and vice versa as each of the customer accounts or merchant accounts is merely required to register with the payment network server for carrying out payment transactions using fund transfer.

As will be explained in more detail later in FIGS. 3 and 5, a customer account and a merchant account are each required to register with the payment network server before a payment transaction at a POS terminal can proceed using fund transfer. Moreover, steps of a method for tokenisation of the customer account during registration is discussed in FIG. 4. Details of how a customer and a merchant may register with the payment network server is further explained in FIGS. 6 and 7 respectively. Processing steps of carrying out a payment transaction at a POS terminal using fund transfer, in accordance with an embodiment of the invention, is also illustrated in FIG. 8.

Figure 2:
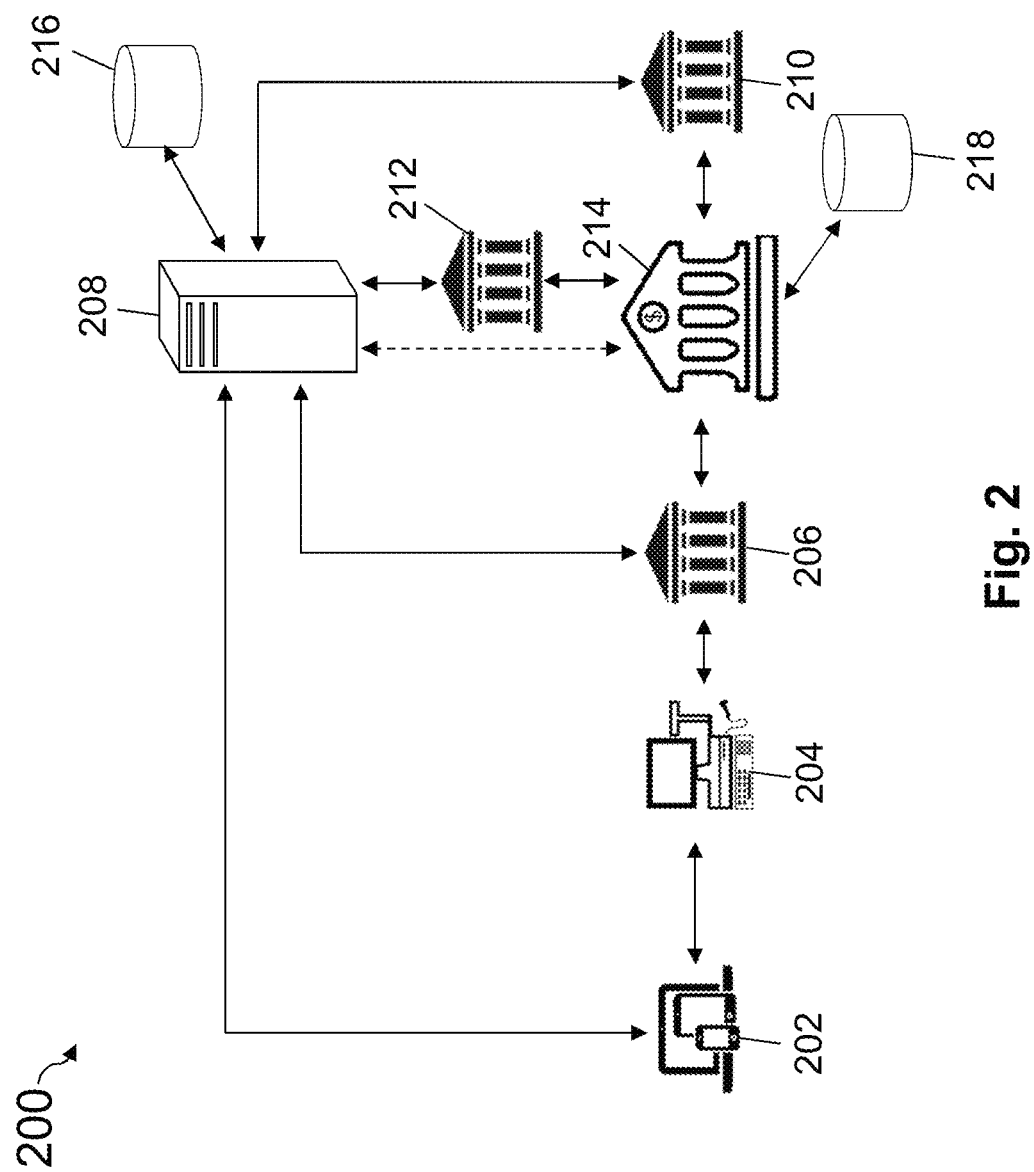
FIG. 2 shows a computerised network for performing the method of FIG. 1 in accordance with the first embodiment of the invention.

Referring to FIG. 2, a computerised network 200 for performing the method 100 in accordance with the first embodiment of the invention is shown. The computerised network 200 comprises a payment network server 208 which is associated with an intermediate account maintained at an intermediate financial institution associated with an intermediate account server 212. The intermediate account is used by the payment network server 208 to facilitate fund transfers between a merchant account and a customer account for payment transactions made at a POS terminal. The payment network server is a server associated with a payment network such as the Banknet payment network operated by MasterCard®. As shown in FIG. 2, the payment network server 208 is in communication with the intermediate account server 212. The payment network server 208 is also in communication with an acquirer server 206 and an issuer server 210. The acquirer server 206 is operated by an acquiring institution at which the merchant maintains an account to receive funds. The issuer server 210 is associated with an issuer institution which maintains payment accounts for customers. The computerised network 200 further comprises a customer electronic device 202 and a merchant apparatus 204 (e.g. a Point-of-Sale (POS) terminal). The customer electronic device 202 may be in communication with the payment network server 208 and/or the merchant apparatus 204.

In an embodiment, the customer electronic device 202 initiates a payment transaction at the merchant apparatus 204. The customer may opt to complete the payment transaction using fund transfer via the customer electronic device 202 or the merchant apparatus 204. In response, the merchant apparatus 204 may generate a fund transfer indicator to indicate that the payment transaction is to proceed using fund transfer, and transmit a payment transaction request to the acquirer server 206 where the payment transaction request comprises transaction details and a fund transfer indicator. The transaction details comprise at least a customer identifier, a merchant identifier, and a payment amount. The customer identifier is an identifier which is uniquely associated with a customer account for use in a payment transaction at a POS terminal using fund transfer. The customer identifier may be a token associated with the customer account, an account number of the customer account, or an identification number of the customer (e.g. a mobile phone number). Similarly, the merchant identifier is an identifier which is uniquely associated with a merchant account for use in the payment transaction at the POS terminal using fund transfer. The merchant identifier may be a merchant code, an account number of the merchant account, an address of the merchant etc. The account number of the customer account or the merchant account may further comprise a bank identification code (BIN) where the BIN identifies uniquely a server associated with a financial institution administering the customer account and/or the merchant account. The fund transfer indicator may be a single character or a string of numbers or alphanumeric or letters or codes accompanying the payment transaction request which serves to indicate that the payment transaction is to be processed by fund transfer. The fund transfer indicator may be a generic code for all payment transactions using fund transfer, or it may be a specific code that includes a generic portion to indicate that it is a payment transaction using fund transfer and a specific portion (e.g. a time stamp) that is unique to the payment transaction currently being processed. After receiving the payment transaction request and the fund transfer indicator from the merchant apparatus 204, the acquirer server 206 forwards this information to the payment network server 208 for processing the payment transaction as described previously in the method 100 of FIG. 1.

In order to facilitate fund transfers between a customer account and a merchant account associated with the payment transaction, the payment network server 208 transmits a fund transfer request to an electronic payment system 214 via the intermediate account server 212 in accordance with the step 108 described in FIG. 1. In embodiments where the payment network server 208 is in direct communication with the electronic payment system, the fund transfer request from the payment network server 208 may be transmitted to the electronic payment system 214 directly. The electronic payment system 214 maybe a system associated with an automated clearing house or VocaLink™ or the like which facilitates electronic payments between a plurality of financial institutions. As shown in FIG. 2, the electronic payment system 214 is in communication with the acquirer server 206, the issuer server 210 and the intermediate account server 212. In embodiments, the acquirer institution associated with the acquirer server 206, the issuer institution associated with the issuer server 210 and the intermediate financial institution associated with the intermediate account server 212 are all registered with the electronic payment system 214 for processing payments using fund transfers.

Although only one customer electronic device 202 and only one merchant apparatus 204 is shown in FIG. 2, a plurality of customer electronic devices 202 associated with different customers and a plurality of merchant apparatuses 204 associated with respective merchants may also form part of the computerised network 200. Similarly, a plurality of acquirer servers 206 and a plurality of issuer servers 210 may also be in communication with the payment network server 208 and the electronic payment system 214, and form part of the computerised network 200. Moreover, a payment network database 216 is operationally connected to the payment network server 208. The payment network database 216 serves at least to store customer mandates and merchant mandates which are associated with customer identifiers and merchant identifiers respectively. As will be explained later in relation to FIGS. 6 and 7, the customer mandates and the merchant mandates are created at the payment network server 208 when customers and merchants register at the payment network server 208 for processing payment transactions at POS terminals using fund transfer. The customer mandates and the merchant mandates are subsequently retrieved during payment transactions and are transmitted to the electronic payment system 214 for processing the fund transfer. The payment network database 216 may also store data in regards to payment transactions processed using fund transfer by the payment network server 208. There is also provided an electronic payment database 218 in communication with the electronic payment system 214. The electronic payment database 218 serves at least to store customer transfer instructions associated with customer mandates and merchant transfer instructions associated with merchant mandates. The customer transfer instructions and the merchant transfer instructions are retrieved by the electronic payment system 214 to carry out fund transfer between the appropriate accounts as discussed below in relation to FIG. 8. Communication between the servers and databases may take place via any type of network, for example, a virtual private network (VPN), the Internet, a local area and/or wide area network (LAN and/or WAN), and so on.

Figure 3:
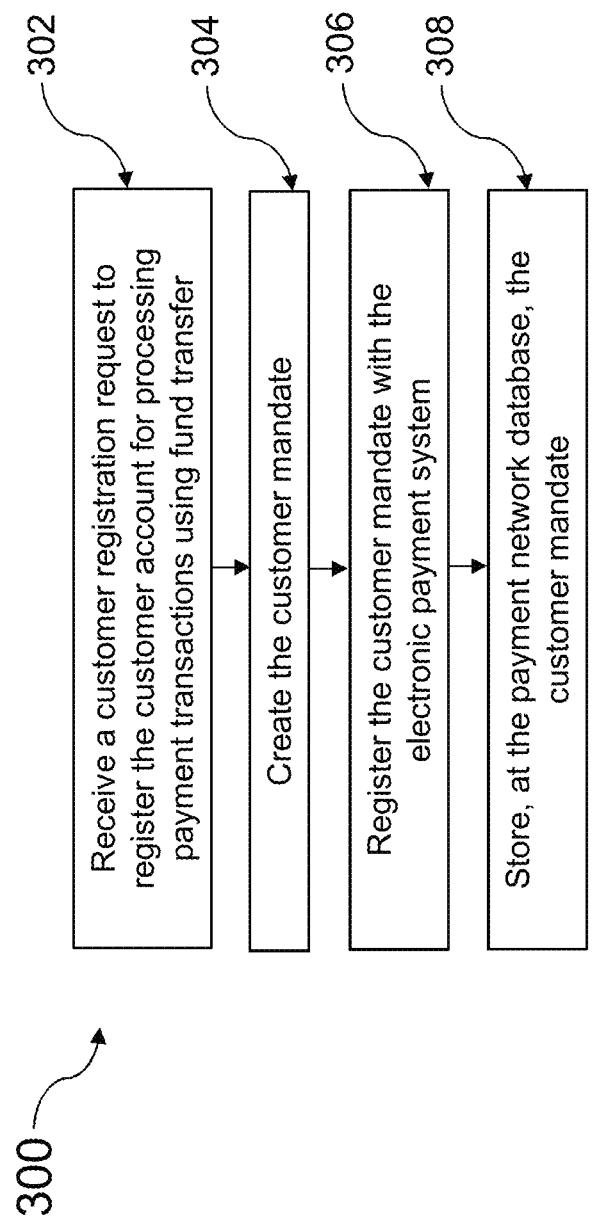
FIG. 3 shows steps of a method for registering a customer account for processing payment transactions using fund transfer in accordance with an embodiment of the invention.

FIG. 3 shows steps of a method 300 for registering a customer account for processing payment transactions using fund transfer in accordance with an embodiment of the invention.

In a step 302, the payment network server 208 receives a customer registration request to register a customer account for processing payment transactions using fund transfer from a customer electronic device 202. The customer registration request comprises at least a customer identifier. The customer identifier is an identifier which is uniquely associated to a customer account for use in payment transaction at a POS terminal using fund transfer. The customer identifier may be a token associated with the customer account, an account number of the customer account, or an identification number of the customer.

In a step 304, the payment network server 208 creates a customer mandate associated with the customer identifier. The customer mandate may be an identification for a customer transfer instruction associated with transferring funds from the customer account to an intermediate account associated with the payment network server 208. In embodiments, the customer mandate is a string of numbers or alphanumeric characters uniquely associated with the customer identifier as well as the customer transfer instruction.

In a step 306, the payment network server 208 registers the customer mandate created in the step 304 with the electronic payment system 214. In embodiments, registering the customer mandate with the electronic payment system 214 comprises transmitting a customer transfer registration request to create the customer transfer instruction associated with the customer mandate. In embodiments, the customer transfer instruction is a standing instruction which allows transfer of funds from the customer account to the intermediate account as long as the customer is registered with the payment network server to carry out payment transactions using fund transfer at POS terminals.

In a step 308, the customer mandate is stored at the payment network database 216. The stored customer mandate may be retrieved upon receiving a payment transaction request comprising the customer identifier associated with the customer mandate.

Figure 4:
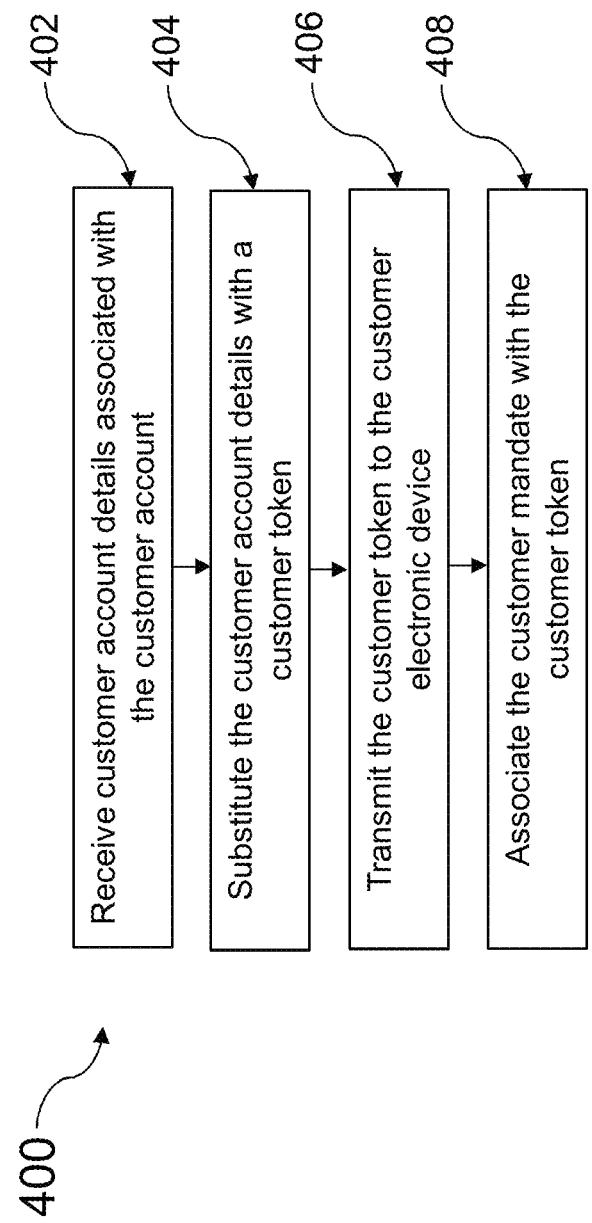
FIG. 4 shows steps of a method for tokenisation of a customer account in accordance with an embodiment of the invention.

FIG. 4 illustrates steps of a method 400 for tokenisation of a customer account in accordance with an embodiment of the invention.

In a step 402, the payment network server is configured to receive customer account details associated with the customer account from the customer electronic device 202. The customer account details may comprise a customer account number where the customer account number identifies the issuer server 210 associated with the customer account.

In a step 404, the payment network server is configured to substitute the customer account details with a customer token. The customer token may comprise unique identification symbols which replace sensitive data relating to the customer account while retaining all the essential information about the data. Notably, the token may comprise encrypted customer account details.

In a step 406, the payment network server 208 is configured to transmit the customer token to the customer electronic device 202. In embodiments, the customer token is stored locally at the customer electronic device 202 and is associated with an application ("App") of the customer electronic device 202 such that the App retrieves the customer token and transmits it to the merchant apparatus 204 when a payment transaction is requested at the merchant apparatus 204.

In a step 408, the payment network server 208 is configured to associate the customer mandate with the customer token.

Although the step 408 of associating the customer mandate with the customer token is carried out after the step 406 as shown in FIG. 4, in embodiments, these steps (i.e. the steps 406 and 408) can be carried out simultaneously. In some embodiments, the step 408 is carried out prior to carrying out the step 406.

Figure 5:
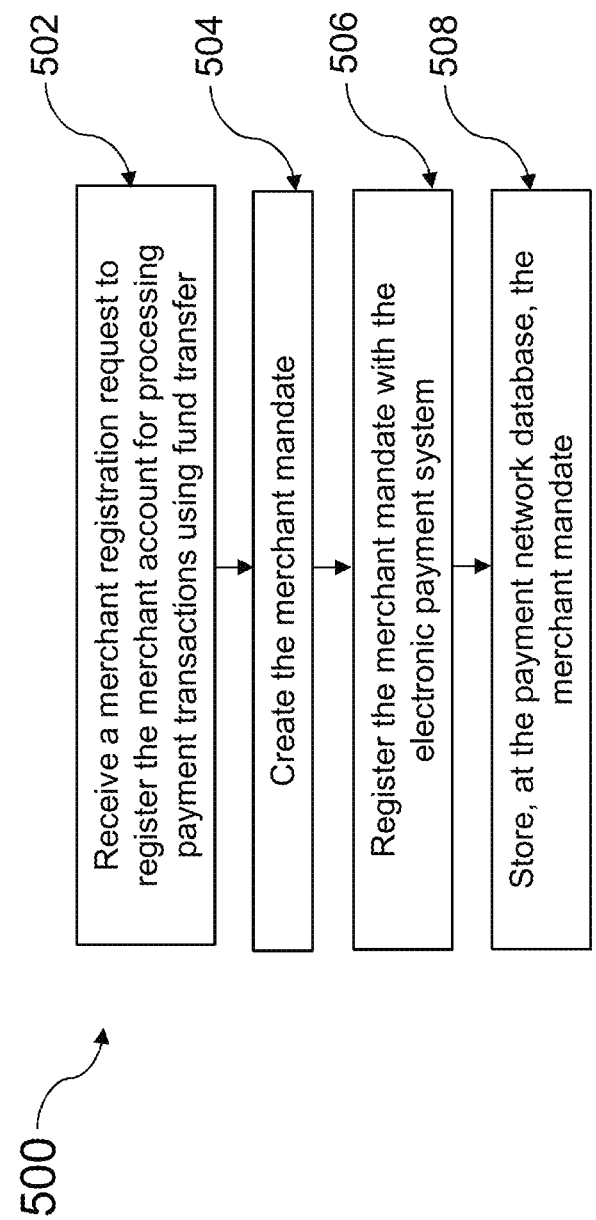
FIG. 5 shows steps of a method for registering a merchant account for processing payment transactions using fund transfer in accordance with an embodiment of the invention.

FIG. 5 shows steps of a method 500 for registering a merchant account for processing payment transactions using fund transfer in accordance with an embodiment of the invention.

In a step 502, the payment network server 208 receives a merchant registration request to register a merchant account for processing payment transactions using fund transfer, from the merchant. The merchant registration request comprises at least a merchant identifier. The merchant identifier is an identifier which is uniquely associated with a merchant account for use in a payment transaction at a POS terminal using fund transfer. The merchant identifier may be a merchant code, an account number of the merchant account, an address of the merchant etc. In an embodiment, the merchant register request is received from the merchant at the payment network server 208 directly. In other words, the merchant may communicate with the payment network server 208 directly for registering of processing payment transactions using fund transfer. In another embodiment, the merchant register request is received from the merchant at the payment network server 208 via the merchant apparatus 204 (e.g. a POS terminal). In an embodiment, the merchant register request is received from the merchant at the payment network server 208 via the acquirer server 206. This may be done either by the merchant transmitting the merchant register request directly to the acquirer server 206 or via the merchant apparatus 204 (e.g. a POS terminal).

In a step 504, the payment network server 208 creates a merchant mandate associated with the merchant identifier. The merchant mandate may be an identification for a merchant transfer instruction associated with transferring funds from the intermediate account to the merchant account. In embodiments, the merchant mandate is a string of numbers or alphanumeric characters uniquely associated with the merchant identifier as well as the merchant transfer instruction.

In a step 506, the payment network server 208 registers the merchant mandate created in the step 504 with the electronic payment system 214. In embodiments, registering the merchant mandate with the electronic payment system 214 comprises transmitting a merchant transfer registration request to the electronic payment system 214 to create the merchant transfer instruction associated with the merchant mandate. This may be done via the intermediate account server 212. In embodiments, the merchant transfer instruction is a standing instruction which allows transfer of funds from the intermediate account to the merchant account as long as the merchant is registered with the payment network server 208 to carry out payment transactions using fund transfer at POS terminals.

In a step 508, the merchant mandate is stored at the payment network database 216. The stored merchant mandate may be retrieved upon receiving a payment transaction request comprising the merchant identifier associated with the merchant mandate.

Figure 6:
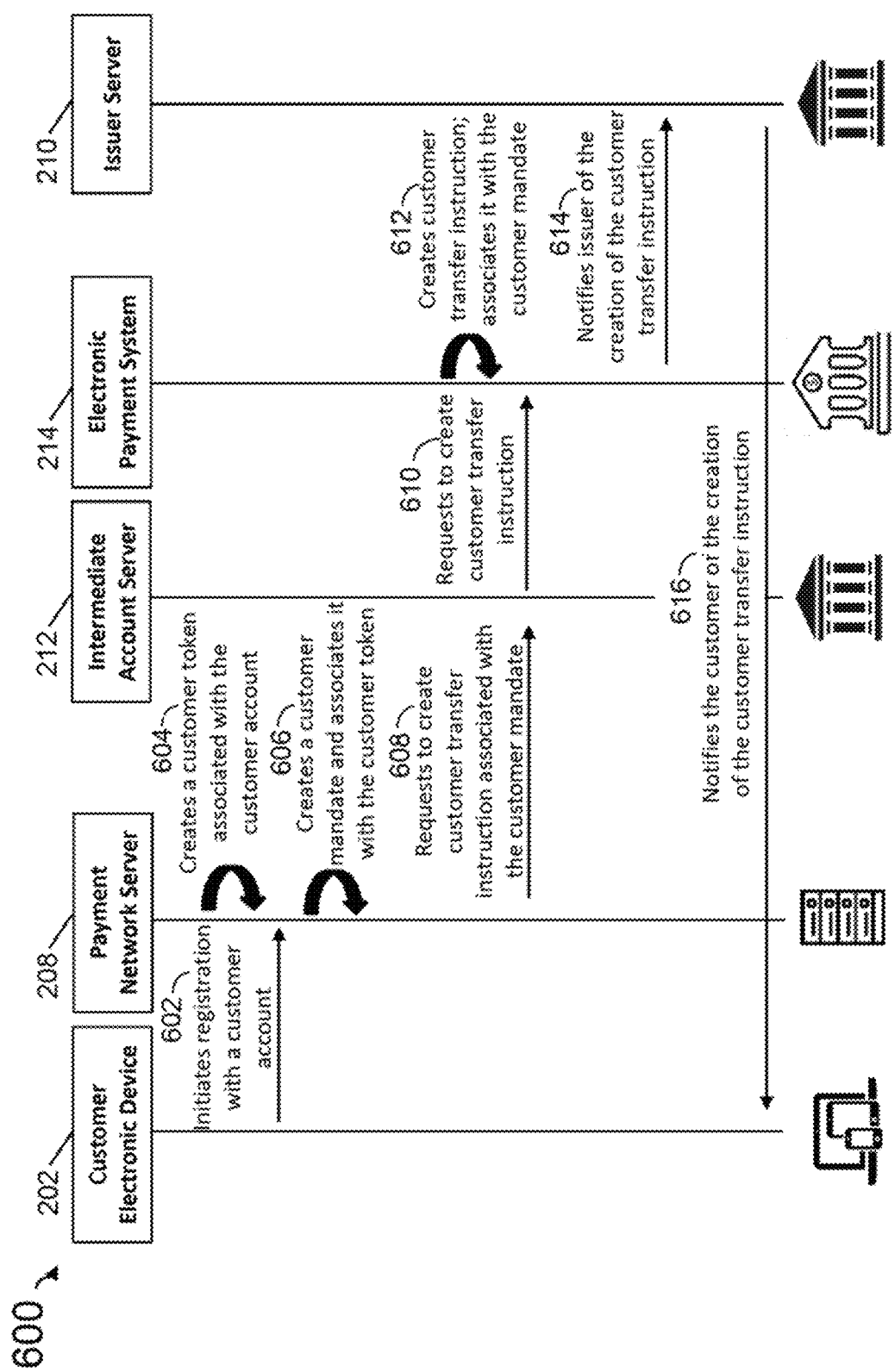
FIG. 6 shows steps of a method for registering a customer account for processing payment transactions using fund transfer in accordance with an embodiment of the invention.

FIG. 6 shows steps of a method 600 for registering a customer account for processing payment transactions using fund transfer in accordance with an embodiment of the invention.

In a step 602, a customer registration request to register a customer account with the payment network server 208 to carry out payment transactions using fund transfer at POS terminals is initiated at the customer electronic device 202. This may be done via an internet banking account of the customer or a mobile banking application ("App") on the customer electronic device 202. The customer account may be a financial account maintained at an issuer institution or an electronic wallet/account (e.g. Masterpass™).

In a step 604, the payment network server 208 in response to the receipt of the customer registration request, creates a customer token using the relevant information of the customer account. The customer token is stored in the payment network database 216 associated with the payment network server 208. The step 604 of tokenization of the customer account may be an optional step.

After the customer token is created in the step 604, the payment network server 208 is configured to create the customer mandate associated with the customer transfer instruction related to transferring funds from the customer account to the intermediate account associated with the payment network server 208, in a step 606. The customer mandate is then associated with the customer token and stored at the payment network database 216. In embodiments where the customer account is not tokenised in the step 604, a customer mandate is created using details (e.g. customer account number etc.) of the customer account directly. The customer mandate created is uniquely associated with the customer identifier (e.g. the customer account number etc.) and stored at the payment network database 216.

After the creation of the customer mandate in the step 606, a customer transfer registration request to create the customer transfer instruction associated with the customer mandate is transmitted to the intermediate account server 212 in a step 608. The customer transfer registration request is then transmitted to the electronic payment system 214 in a step 610.

In a step 612, the electronic payment system 214 creates the customer transfer instruction, the customer transfer instruction comprising instructions to transfer funds from the customer account to the intermediate account associated with the payment network server 208 which is maintained at the intermediate financial institution associated with the intermediate account server 212. The electronic payment system 214 may be configured to associate the customer transfer instruction with the customer mandate. In embodiments, the customer mandate and the customer transfer instruction can be used repeatedly such that only a one-time registration of the customer mandate and the customer transfer instruction is required.

After the customer transfer instruction associated with the customer mandate has been created, the electronic payment system 214 is configured to transmit a customer registration response indicating whether the registration has been successful to the issuer server 210 in a step 614. The customer registration response may also be transmitted to the customer electronic device 202 in a step 616 to notify the customer of a result of the registration.

Figure 7:
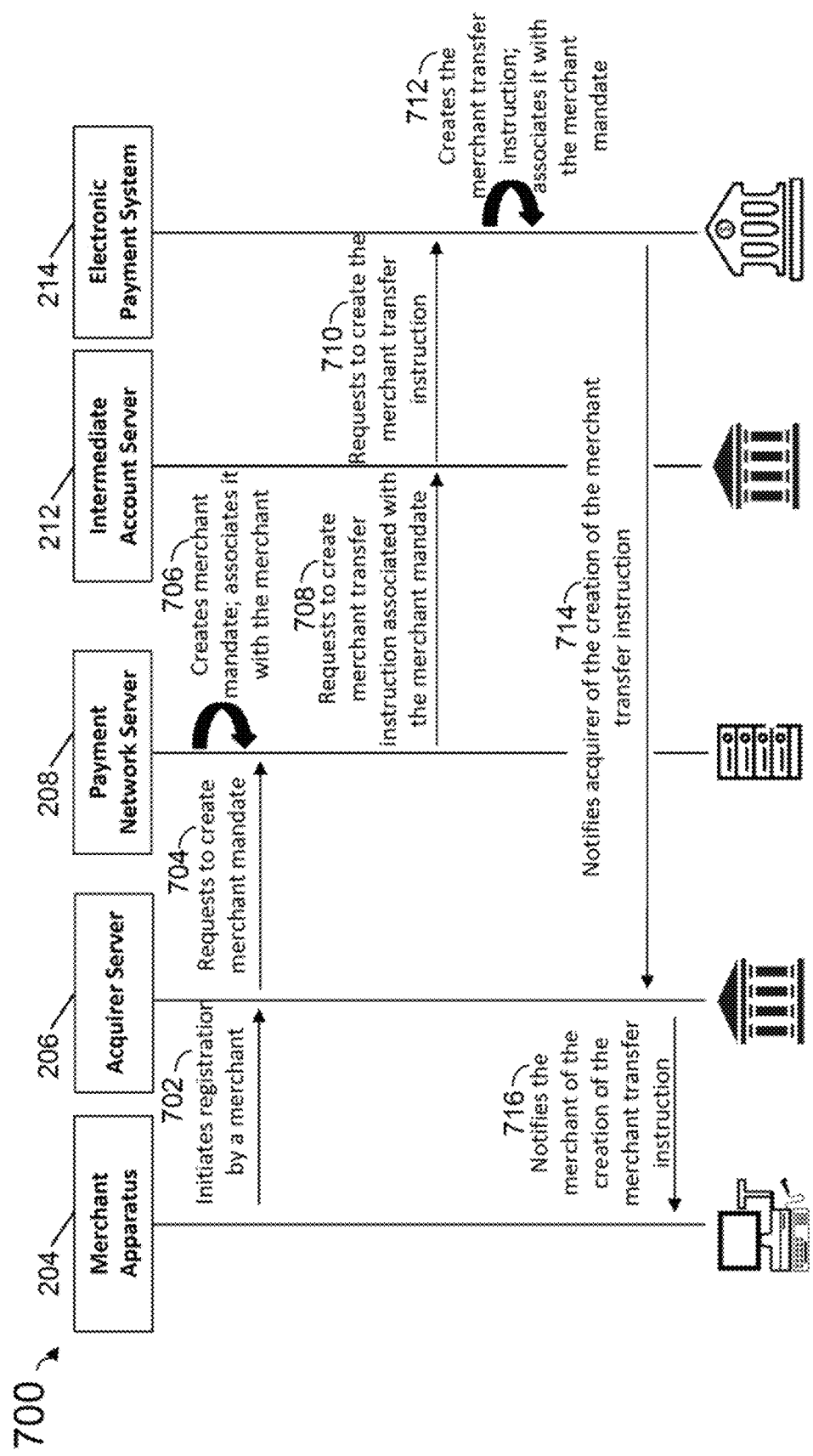
FIG. 7 shows steps of a method for registering a merchant account for processing payment transactions using fund transfer in accordance with an embodiment of the invention.
Figure 8:
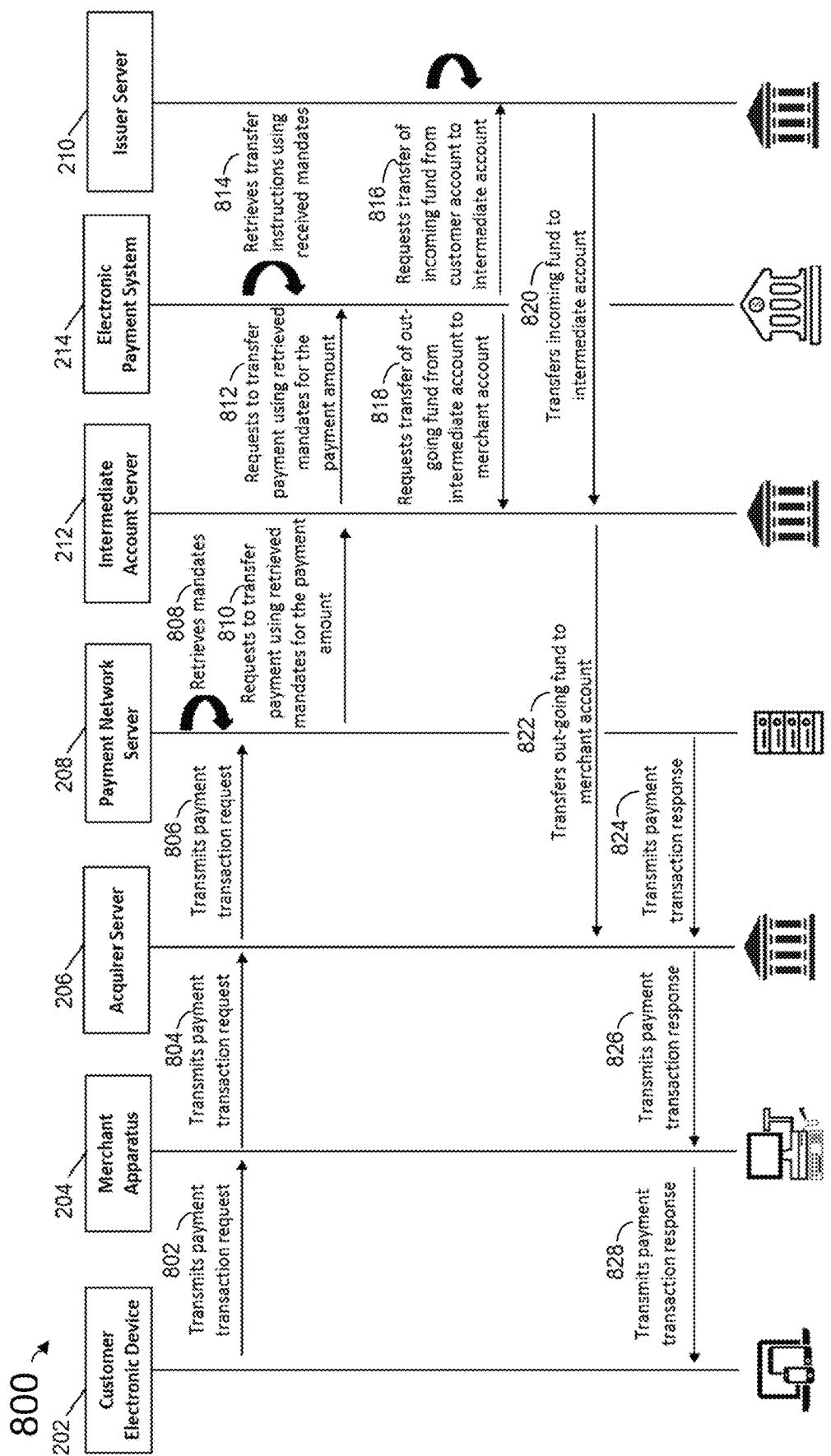
FIG. 8 shows steps of a method for processing a payment transaction using fund transfer in accordance with an embodiment of the invention.

FIG. 7 shows steps of a method 700 for registering the merchant account for processing payment transactions using fund transfer in accordance with an embodiment of the invention. In embodiments, the merchant account is maintained at the acquirer institution associated with the acquirer server 206.

The merchant registration request to register the merchant account with the payment network server 208 to carry out payment transactions using fund transfer at POS terminals is initiated at the merchant apparatus 204 and transmitted to the acquirer server 206 in a step 702. In a step 704, the acquirer server forwards the merchant registration request to the payment network server 208.

In a step 706, the payment network server 208 in response to the receipt of the merchant registration request, creates the merchant mandate where the merchant mandate is associated with the merchant transfer instruction for transferring funds from the intermediate account to the merchant account. The payment network server 208 may be configured to associate the merchant mandate with the merchant. This may be carried out by associating the merchant mandate with the merchant identifier associated with the merchant, where the merchant identifier is any string or portion of numbers, alphanumeric or symbols in any combination that can uniquely identified the merchant. In embodiments, the merchant identifier and the merchant mandate are stored in the payment network database 216.

After the merchant mandate is created in the step 706, a merchant transfer registration request to create the merchant transfer instruction associated with the merchant mandate is transmitted to the intermediate account server 212 in a step 708. The merchant transfer registration request is then transmitted to the electronic payment system 214 in a step 710.

In a step 712, the electronic payment system 214 creates the merchant transfer instruction, the merchant transfer instruction comprising transferring of funds from the intermediate account to the merchant account. The electronic payment system 214 may be configured to associate the merchant transfer instruction with the merchant mandate. In embodiments, the merchant mandate and the merchant transfer instruction can be used repeatedly such that only a one-time registration of the merchant mandate and the merchant transfer instruction is required.

After the merchant transfer instruction associated with the merchant mandate has been created, the electronic payment system 214 is configured to transmit a merchant registration response indicating whether the registration has been successful to the acquirer server 206 in a step 714. The merchant registration response may be transmitted in a step 716 from the acquirer server 206 to the merchant apparatus 204 to notify the merchant of a result of the registration.

FIG. 8 shows an illustration of a method 800 for processing a payment transaction using fund transfer in accordance with an embodiment of the invention. Typically, a customer may initiate the payment transaction at the merchant apparatus 204 in a retail location associated with a merchant. The merchant apparatus 204 may be a Point-of-Sale (POS) terminal. The merchant apparatus 204 may be configured to interact with the customer electronic device 202 connected to the computerised network 200 as shown in FIG. 2.

The customer may initiate the payment transaction request, via the customer electronic device 202, for the payment transaction using fund transfer at the merchant apparatus 204 in a step 802. The payment transaction request comprises at least transaction details, where the transaction details comprise at least the customer identifier, the merchant identifier, and the payment amount. In an embodiment, the customer is required to specify at the merchant apparatus 204 when initiating the payment transaction request that it is a payment transaction using fund transfer. This may be done by selecting an option which may be presented to the customer at the time of initiating the payment transaction. The merchant apparatus 204 introduces the fund transfer indicator to be tagged to the payment transaction request once it is identified that the payment transaction request is to be processed by fund transfer. In another embodiment, the customer transmits the payment transaction request via an "App" in the customer electronic device 202 which is capable of generating the payment transaction request associated with fund transfer at the merchant apparatus. In this case, the payment transaction request transmitted from the customer electronic device 202 may comprise the transaction details and the fund transfer indicator. The merchant apparatus 204 does not introduce the fund transfer indicator in this scenario. In either case, the merchant apparatus 204 then transmits the payment transaction request and the fund transfer indicator to the acquirer server 206 in a step 804. The acquirer server 206 subsequently forwards the information to the payment network server 208 to be processed in a step 806.

After the payment transaction request is received from the acquirer server 206 at the step 806, the payment network server 208 is configured to query the payment network database 216 to determine if the customer identifier is associated with a customer mandate and if the merchant identifier is associated with a merchant mandate (e.g. as shown in the step 104 of the method 100 in FIG. 1). The customer mandate may be associated with a customer transfer instruction for transferring funds from a customer account to an intermediate account and the merchant mandate may be associated with a merchant transfer instruction for transferring funds from the intermediate account to a merchant account. If it is determined that the customer identifier and the merchant identifier is associated with the customer mandate and the merchant mandate respectively, the payment network server 208 is configured to retrieve the customer mandate and the merchant mandate using the payment network database 216 in a step 808. After retrieving the customer mandate and the merchant mandate from the payment network database 216, the payment network server 208 is configured to transmit a fund transfer request to the intermediate account server 212 for performing fund transfers using the customer mandate, the merchant mandate and the payment amount in a step 810. The fund transfer request is in turn transmitted to the electronic payment system 214 from the intermediate account server 212 in a step 812. In embodiments, the payment network server 208 is configured to transmit the fund transfer request to the electronic payment system 214 directly. The electronic payment system 214 is an electronic network for transferring funds between the customer account and the intermediate account, and between the intermediate account and the merchant account. Examples of an electronic payment system 214 is an automated clearing house or VocaLink™. In embodiments, the payment network server 208 is prompted to carry out the above steps by the fund transfer indicator comprised in the payment transaction request received from the merchant apparatus 204 via the acquirer server 206.

The electronic payment system 214 is configured to query the electronic payment database 218 to determine if the customer mandate is associated with a customer transfer instruction for transferring funds from a customer account to an intermediate account associated with a payment network and if the merchant mandate is associated with a merchant transfer instruction for transferring funds from the intermediate account to a merchant account, after receiving the fund transfer request from the payment network server 208. If it is determined that the customer mandate is associated with the customer transfer instruction and the merchant mandate is associated with the merchant transfer instruction respectively, the electronic payment system 214 is configured to retrieve the customer transfer instruction and the merchant transfer instruction in a step 814.

After the customer transfer instruction and the merchant transfer instruction are retrieved in the step 814, the electronic payment system 214 is configured to transmit a request to the issuer server 210 to transfer an incoming fund associated with the payment amount from the customer account to the intermediate account in a step 816 and to transmit another request to the intermediate account server 212 to transfer an outgoing fund associated with the payment amount from the intermediate account to the merchant account in a step 818. The steps 816 and 818 may be carried out concurrently or one after the other in any combination.

Consequently, the issuer server 210 receives the request from the electronic payment system 212 and performs a fund transfer of the incoming fund from the customer account to the intermediate account in a step 820, while the intermediate account server 212 receives the request from the electronic payment system 212 and performs a fund transfer of the outgoing fund associated with the payment amount from the intermediate account to the merchant account in a step 822. The steps 820 and 822 may be carried out concurrently or one after the other in any combination. In embodiments, the outgoing fund is transferred from the intermediate account to the merchant account after the incoming fund is transferred from the customer account to the intermediate account.

The payment network server 208 in turn transmits a payment transaction response indicating whether the payment transaction has been approved or refused to proceed to the acquirer server 206 in a step 824. The payment transaction may be refused to proceed if it is determined that the customer identifier is not associated with the customer mandate and/or the merchant identifier is not associated with the merchant mandate in the step 808. The payment transaction response is then forwarded to the merchant apparatus 204 by the acquirer server 206 in a step 826. Once the payment transaction response is received at the merchant apparatus 204, the customer is notified of a result of the transaction by the merchant apparatus 204 via the customer electronic device 202 in a step 828. The payment transaction is either completed, or the payment transaction is refused. In embodiments, the customer is prompted to submit another form of payment for the payment transaction if the payment transaction is refused. Notably, the payment network server 208 may transmit the payment transaction response indicating whether the payment transaction has been approved or refused prior to completion of the fund transfers, thus saving time.

Figure 9:
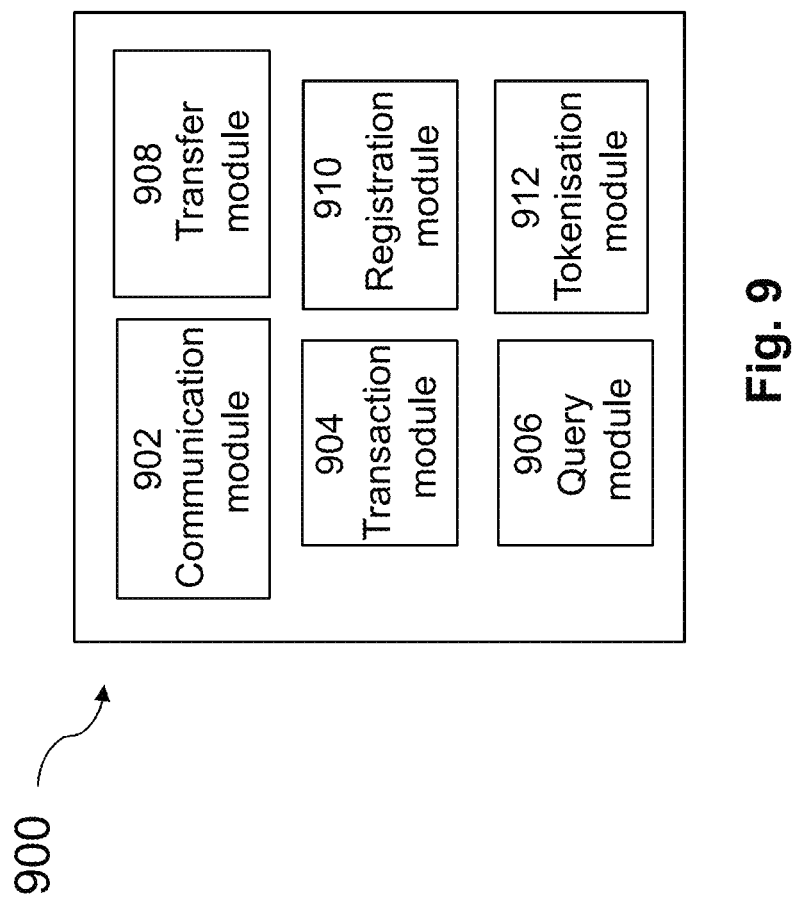
FIG. 9 shows schematically a functional structure of the payment network server which may be used in the computerised network as shown in FIG. 2 in accordance with an embodiment of the invention.

FIG. 9 shows schematically a structure 900 of the payment network server 208 comprised in the computerised network 200 in accordance with embodiments of the invention. The structure 900 of the payment network server 208 comprises a communication module 902, a transaction module 904, a query module 906, a transfer module 908, a registration module 910 and a tokenisation module 912.

The communication module 902 is configured to enable the payment network server 208 to communicate with at least an acquirer server 206 and an issuer server 210 as provided in the computerised network 200. The communication module 902 may be configured to enable the payment network server 208 to communicate with the intermediate account server 212, the electronic payment system 214 and/or the customer electronic device 202. The communication module 902 is configured to work in tandem with other modules of the payment network server 208 as discussed in more detail below.

The transaction module 904 is configured to allow the payment network server 208 to process a payment transaction request. In other words, the transaction module 904 is configured at least to receive, using the communication module 902, from the POS terminal (i.e. the merchant apparatus 204) via the acquirer server 206, a payment transaction request comprising at least transaction details and a fund transfer indicator (e.g. the step 102 in FIG. 1), and to transmit, to the POS terminal via the acquirer server 206, a payment transaction response indicating if the payment transaction is approved or refused to proceed (e.g. the step 110 in FIG. 1). The transaction details comprise at least a customer identifier, a merchant identifier, and a payment amount, and the fund transfer indicator indicates that the payment transaction is to be processed by fund transfer. The customer identifier may be a token associated with the customer account, an account number of the customer account, or an identification number of the customer. Similarly, the merchant identifier is an identifier which is uniquely associated with a merchant account for use in the payment transaction at the POS terminal using fund transfer. The merchant identifier may be a merchant code, an account number of the merchant account, an address of the merchant etc. In particular, the transaction module 904 identifies and sorts the information in the transaction details for use in further processes (e.g. the steps 104 and 106 of FIG. 1 etc.). The transaction module 904 may be configured to notify the customer electronic device 202 of a result of the fund transfer request made e.g. in the step 810. The transaction module 904 may transmit relevant information isolated from the payment transaction request to other modules of the payment network server 208 for further processing.

The query module 906 is configured to communicate, via the communication module 902, with a payment network database 216 to determine if the customer identifier is associated with a customer mandate and if the merchant identifier is associated with a merchant mandate. The customer mandate is associated with a customer transfer instruction for transferring funds from a customer account to an intermediate account and the merchant mandate is associated with a merchant transfer instruction for transferring funds from the intermediate account to a merchant account. If it is determined that the customer identifier and the merchant identifier is associated with the customer mandate and the merchant mandate respectively, the query module 906 may be configured to retrieve the customer mandate and the merchant mandate from the payment network database 216. In other words, the query module 906 may be configured to carry out the steps 104 and 106 as shown in FIG. 1.

The transfer module 908 is configured to request, via the communication module 902, the electronic payment system 214 to perform fund transfers using the customer mandate, the merchant mandate and the payment amount (e.g. in the step 108 of FIG. 1). When processing registration of a customer for processing payment transactions using fund transfer, the transfer module 908 of the payment network server 208 may be configured to register the customer mandate with the electronic payment system 214 (e.g. by transmitting a customer transfer registration request to the electronic payment system 214), and to store the customer mandate at the payment network database 216. When processing registration of a merchant for processing payment transactions using fund transfer, the transfer module 908 of the payment network server 208 may be configured to register the merchant mandate with the electronic payment system 214 (e.g. by transmitting a merchant transfer registration request to the electronic payment system 214), and to store the merchant mandate at the payment network database 216.

The registration module 910 is configured to receive registration requests from the customer and/or the merchant to register them for processing payment transactions using fund transfer. For registration of the customer, the registration module 910 is configured to receive, from the customer electronic device 202, a customer registration request to register the customer account for processing payment transactions using fund transfer, where the customer registration request comprises at least the customer identifier. The registration module 910 may be configured to create the customer mandate associated with the customer identifier. For registration of the merchant, the registration module 910 is configured to receive, from the POS terminal (i.e. the merchant apparatus 204) via the communication module 902, a merchant registration request to register the merchant account for processing payment transactions using fund transfer, where the merchant registration request comprises the merchant identifier. The registration module 910 may be configured to create the merchant mandate associated with the merchant identifier.

In embodiments, details associated with the customer account may be tokenised to improve security during processing of the payment transaction using fund transfer. The tokenisation module 912 may be configured to receive, from the customer electronic device 202, customer account details associated with the customer account where the customer account details comprises at least a customer account number. The customer account number may identify an issuer server 210 associated with the customer account. The tokenisation module 912 may be configured to substitute the customer account details with a customer token and transmit the customer token to the customer electronic device 202. The customer token may be used subsequently by the customer electronic device 202 to process payment transactions using fund transfer. The registration module 910, together with the tokenisation module 912, may be configured to associate the customer mandate with the customer token where the customer token is used as a customer identifier for processing the payment transaction. Information relating to the association of the customer mandate with the customer token may be stored in the payment network database 216.

FIG. 10 is a block diagram showing a technical architecture 1000 of the payment network server 208. The issuer server 210 and/or the acquirer server 206 may also have this technical architecture. The merchant apparatus 204, the intermediate account server 212 and/or the electronic payment system 214 may also have similar technical architectures.

The technical architecture includes a processor 1002 (which may be referred to as a central processor unit or CPU) that is in communication with memory devices including secondary storage 1004 (such as disk drives), read only memory (ROM) 1006, and random access memory (RAM) 1008. The processor 1002 may be implemented as one or more CPU chips. The technical architecture may further comprise input/output (I/O) devices 1010, and network connectivity devices 1012.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs which are loaded into RAM 1008 when such programs are selected for execution.

In this embodiment, the secondary storage 1004 has a processing component 1004a comprising non-transitory instructions operative by the processor 1002 to perform various operations of the method of the present disclosure. The ROM 1006 is used to store instructions and perhaps data which are read during program execution. The secondary storage 1004, the RAM 1008, and/or the ROM 1006 may be referred to in some contexts as computer readable storage media and/or non-transitory computer readable media.

I/O devices 1010 may include printers, video monitors, liquid crystal displays (LCDs), plasma displays, touch screen displays, graphic user interfaces (GUIs), keyboards, keypads, switches, dials, mice, track balls, voice recognizers, card readers, paper tape readers, or other input or output devices.

The network connectivity devices 1012 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other network devices. These network connectivity devices 1012 may enable the processor 1002 to communicate with the Internet or one or more intranets. With such a network connection, it is contemplated that the processor 1002 might receive information from the network, or might output information to the network in the course of performing the above-described method operations. Such information, which is often represented as a sequence of instructions to be executed using processor 1002, may be received from and outputted to the network, for example, in the form of a computer data signal embodied in a carrier wave.

The processor 1002 executes instructions, codes, computer programs, scripts which it accesses from hard disk, floppy disk, optical disk (these various disk based systems may all be considered secondary storage 1004), flash drive, ROM 1006, RAM 1008, or the network connectivity devices 1012. While only one processor 1002 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing an application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 1002, the RAM 1008, and the ROM 1006 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figures 11, 12:
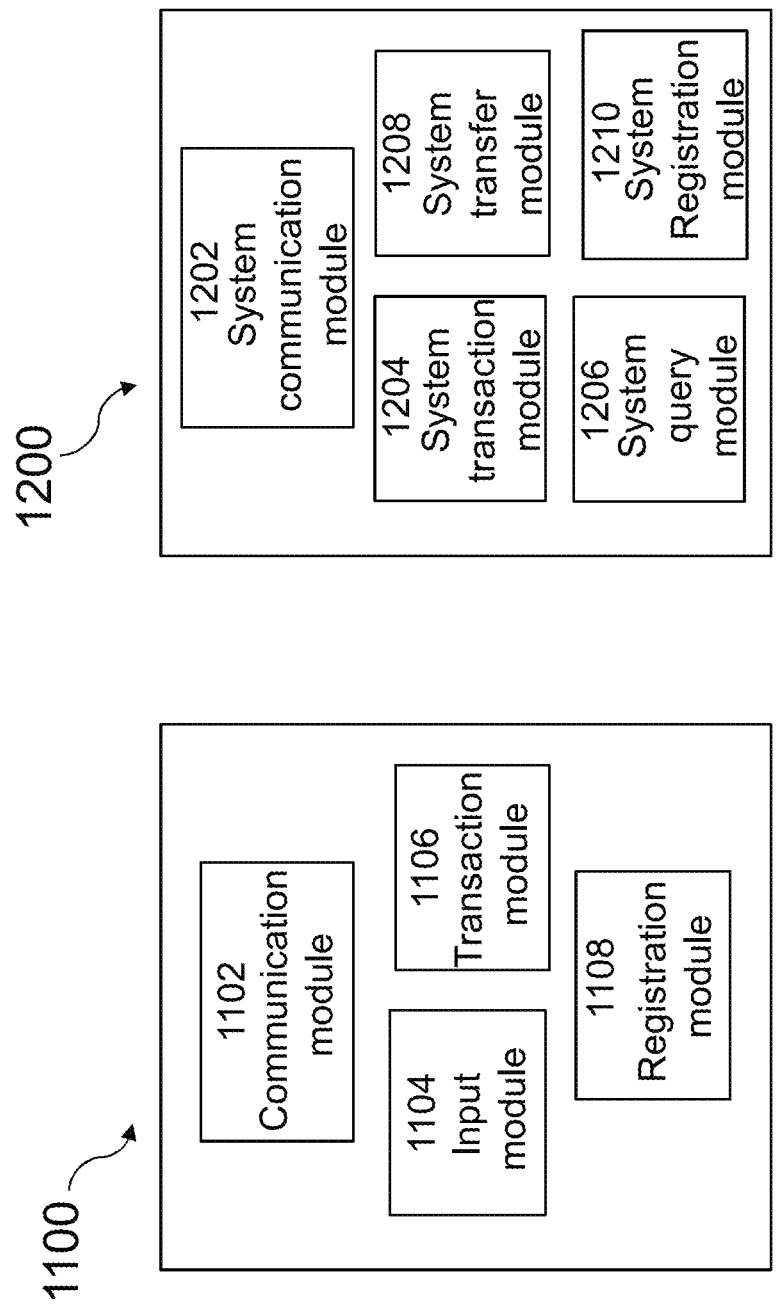
FIG. 11 shows schematically a functional structure of the merchant apparatus which may be used in the computerised network as shown in FIG. 2 in accordance with an embodiment of the invention.
FIG. 12 shows schematically a functional structure of the electronic payment system which may be used in the computerised network as shown in FIG. 2 in accordance with an embodiment of the invention.

FIG. 11 shows schematically a structure 1100 of the merchant apparatus 204 (e.g. a POS terminal) comprised in the computerised network 200 in accordance with embodiments of the invention. The structure 1100 of the merchant apparatus 204 comprises a communication module 1102, an input module 1104, a transaction module 1106, and a registration module 1108.

The communication module 1102 is configured to enable the merchant apparatus 204 to communicate with at least the customer electronic device 202 and an acquirer server 206 as provided in the computerised network 200. The communication module 1102 of the merchant apparatus 204 may be configured to transmit to the acquirer server 206, a payment transaction request comprising transaction details and a fund transfer indicator where the fund transfer indicator may be generated by the transaction module 1106 as discussed below. The communication module 1102 may be configured to receive, from the acquirer server 206, a payment transaction response indicating whether the payment transaction is approved or refused to proceed. The communication module 1102 may be configured to transmit the payment transaction response to the customer electronic device 202. The communication module 1102 is configured to work in tandem with other modules of the merchant apparatus 204 as discussed in more detail below.

The input module 1104 is configured to allow the merchant apparatus 204 to receive a transaction request comprising at least the transaction details. The transaction request, or at least part of it, may be received from the customer electronic device 202. The transaction details may comprise at least the customer identifier and the payment amount. The input module 1104 may be configured to receive a mode of payment instruction where the mode of payment instruction indicates that the payment transaction is to be completed using fund transfer.

The transaction module 1106 of the merchant apparatus 204 is configured to generate the fund transfer indicator for the payment transaction using fund transfer. In embodiments, the transaction module 1106 generates the fund transfer indicator when the merchant apparatus via the input module 1104 receives the mode of payment instruction indicating that the payment transaction is to be completed using fund transfer. The fund transfer indicator may be incorporated to the payment transaction request and be transmitted to the acquirer server 206 via the communication module 1102 as discussed above.

The registration module 1108 is configured to transmit, to the payment network server 208 via the acquirer server 206, a merchant registration request to register a merchant account for processing payment transactions using fund transfer. The merchant registration request may then be processed as detailed in the method 700 as shown in FIG. 7.

FIG. 12 shows schematically a structure 1200 of the electronic payment system 214 comprised in the computerised network 200 in accordance with embodiments of the invention. The structure 1200 of the electronic payment system 214 comprises a system communication module 1202, a system transaction module 1204, a system query module 1206, a system transfer module 1208, and a system registration module 1210.

The system communication module 1202 is configured to enable the electronic payment system 214 to communicate with at least an acquirer server 206 and an issuer server 210 as provided in the computerised network 200. The system communication module 1202 may be configured to enable the electronic payment system 214 to communicate with the intermediate account server 212 and/or the payment network server 208. The system communication module 1202 is configured to work in tandem with other modules of the electronic payment system 214 as discussed in more detail below.

The system transaction module 1204 is configured to receive, from a payment network server 208, a fund transfer request comprising at least a customer mandate, a merchant mandate and a payment amount. In embodiments, the system transaction module 1204 is configured to transmit via the system communication module 1202, a fund transfer response to the payment network server 208 to notify the payment server 208 if the fund transfer request has been completed successfully.

The system query module 1206 is configured to query an electronic payment database 216 to determine if the customer mandate is associated with a customer transfer instruction for transferring funds from a customer account to an intermediate account associated with a payment network and if the merchant mandate is associated with a merchant transfer instruction for transferring funds from the intermediate account to a merchant account. If it is determined that the customer mandate is associated with the customer transfer instruction and the merchant mandate is associated with the merchant transfer instruction respectively, the query module 1206 may be configured to retrieve the customer transfer instruction and the merchant transfer instruction. The customer transfer instruction and the merchant transfer instruction retrieved may be communicated to the transfer module 1208 for processing the fund transfers via the system communication module 1202.

After the customer transfer instruction and the merchant transfer instruction are retrieved by the system query module 1206, the system transfer module 1208 is configured to transfer an incoming fund associated with the payment amount from the customer account to the intermediate account, and to transfer an outgoing fund associated with the payment amount from the intermediate account to the merchant account. In embodiments, transfer of the incoming fund and the outgoing fund comprises the system transfer module 1208 transmitting, via the system communication module 1202, a request to the issuer server 210 to transfer an incoming fund associated with the payment amount from the customer account to the intermediate account; and transmitting another request, via the system communication module 1202, to the intermediate account server 212 to transfer an outgoing fund associated with the payment amount from the intermediate account to the merchant account. The requests received at the issuer server 210 and the intermediate account server 212 may cause the issuer server 210 and the intermediate account server 212 to perform a fund transfer of the incoming fund from the customer account to the intermediate account and a fund transfer of the outgoing fund associated with the payment amount from the intermediate account to the merchant account respectively (see e.g. the steps 820 and 822 of FIG. 8). In this way, transferring of the incoming fund and the outgoing fund is achieved by the system transfer module 1208. The system transfer module 1208 may be configured to create the customer transfer instruction associated with the customer mandate and the merchant transfer instruction associated with the merchant mandate when the electronic payment system 214 receives a customer transfer registration request and a merchant transfer registration request via the system registration module 1210 respectively.

The system registration module 1210 is configured to receive registration requests from the payment network server 208 for registering the customer transfer instruction and the merchant transfer instruction. The system registration module 1210 is configured to receive, from the payment network server 208 via the system communication module 1202, a customer transfer registration request for creating the customer transfer instruction for transferring funds from the customer account to the intermediate account, and a merchant transfer registration request for creating the merchant transfer instruction for transferring funds from the intermediate account to the merchant account. The system registration module 1210 may be configured to transmit, to the payment network server 208 via the system communication module 1202, a customer transfer registration response indicating if the customer transfer instruction has been created, and a merchant transfer registration response indicating if the merchant transfer instruction has been created.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

The invention claimed is:

1. A payment network server for processing a payment transaction at a point-of-sale (POS) terminal, the server comprising:
    at least one processor; and
    one or more non-transitory computer-readable media having stored thereon program code for processing the payment transaction from the POS terminal, the program code causing the at least one processor to:
        create a token associated with a client;
        receive, from the POS terminal via an acquirer server, a payment transaction request comprising at least transaction details and a fund transfer indicator, the transaction details comprising the token associated with the client provided to the POS terminal from a client device, a customer identifier, a merchant identifier, and a payment amount, the fund transfer indicator indicating that the payment transaction is to be processed by fund transfer;
        transmit, to the POS terminal via the acquirer server, a payment transaction response indicating if the payment transaction is approved or refused to proceed;
        query a payment network database to determine if the token and the customer identifier are associated with a customer mandate and if the merchant identifier is associated with a merchant mandate, the customer mandate being associated with a customer transfer instruction for transferring funds from a customer account to an intermediate account and the merchant mandate being associated with a merchant transfer instruction for transferring funds from the intermediate account to a merchant account;
        retrieve the customer mandate and the merchant mandate if it is determined that the customer identifier and the merchant identifier is associated with the customer mandate and the merchant mandate respectively; and
        request an electronic payment system to perform fund transfers using the customer mandate, the merchant mandate and the payment amount, so as to transfer the payment amount from the customer account to the intermediate account, hold the payment amount specifically for a merchant in the intermediate account, and transfer the payment amount being held in the intermediate account for the merchant from the intermediate account to the merchant account.

2. The server of claim 1, wherein the program code is further configured to cause the at least one processor to:
    receive, from a customer electronic device, a customer registration request to register the customer account for processing payment transactions using fund transfer, the customer registration request comprising at least the customer identifier; and
    create the customer mandate associated with the customer identifier;
    register the customer mandate with the electronic payment system; and
    store, at the payment network database, the customer mandate.

3. The server of claim 1, wherein the program code is further configured to cause the at least one processor to:
    receive, from a customer electronic device, customer account details associated with the customer account, the customer account details comprising at least a customer account number, the customer account number identifying an issuer server associated with the customer account;
    substitute the customer account details with the token;
    transmit the token to the customer electronic device; and
    associate the customer mandate with the token;
    wherein the token is used as a customer identifier for processing the payment transaction.

4. The server of claim 2, wherein the program code is further configured to cause the at least one processor to:
    receive, from a merchant associated with the merchant account, a merchant registration request to register the merchant account for processing payment transactions using fund transfer, the merchant registration request comprising the merchant identifier;

create the merchant mandate associated with the merchant identifier;
register the merchant mandate with the electronic payment system; and
store, at the payment network database, the merchant mandate.

5. The server of claim 4, wherein the program code is further configured to cause the at least one processor to:
notify the customer electronic device of a result of the payment transaction request.

6. The server of claim 4, wherein the electronic payment system is a payment system that facilitates real-time payment.

7. The server of claim 4, further comprising a A-POS terminal for use with the payment network server, the POS terminal configured to:
receive a transaction request comprising at least the transaction details;
receive a mode of payment instruction, the mode of payment instruction indicating that the payment transaction is to be completed using fund transfer;
generate a fund transfer indicator;
transmit the payment transaction request comprising the transaction details and the fund transfer indicator; and
receive the payment transaction response.

8. The server of claim 7, wherein the POS terminal is further configured to:
transmit, to the payment network server, the merchant registration request to register the merchant account for processing payment transactions using fund transfer.

9. A computer-implemented method for processing a payment transaction at a point-of-sale (POS) terminal, the computer-implemented method comprising:
creating a token associated with a client;
receiving, from the POS terminal via an acquirer server, a payment transaction request comprising at least transaction details and a fund transfer indicator, wherein the transaction details comprise the token associated with the client provided to the POS terminal from a client device, a customer identifier, a merchant identifier, and a payment amount, the fund transfer indicator indicating that the payment transaction is to be processed by fund transfer;
querying a payment network database to determine if the token and the customer identifier are associated with a customer mandate and if the merchant identifier is associated with a merchant mandate, the customer mandate being associated with a customer transfer instruction for transferring funds from a customer account to an intermediate account and the merchant mandate being associated with a merchant transfer instruction for transferring funds from the intermediate account to a merchant account;
retrieving the customer mandate and the merchant mandate if it is determined that the customer identifier and the merchant identifier is associated with the customer mandate and the merchant mandate respectively;
requesting an electronic payment system to perform fund transfers using the customer mandate, the merchant mandate and the payment amount, so as to transfer the payment amount from the customer account to the intermediate account, hold the payment amount specifically for a merchant in the intermediate account, and transfer the payment amount being held in the intermediate account for the merchant from the intermediate account to the merchant account; and transmitting, to the POS terminal via the acquirer server, a payment transaction response indicating if the payment transaction is approved or refused to proceed.

10. The method of claim 9, further comprising:
receiving, from a customer electronic device, a customer registration request to register the customer account for processing payment transactions using fund transfer, the customer registration request comprising at least the customer identifier; and
creating the customer mandate associated with the customer identifier;
registering the customer mandate with the electronic payment system; and
storing, at the payment network database, the customer mandate.

11. The method of claim 10 further comprising:
receiving, from a customer electronic device, customer account details associated with the customer account, the customer account details comprising at least a customer account number, the customer account number identifying an issuer server associated with the customer account;
substituting the customer account details with the token;
transmitting the token to the customer electronic device;
associating the customer mandate with the token; and
wherein the token is used as a customer identifier for processing the payment transaction.

12. The method of claim 9, further comprising:
receiving, from a merchant associated with the merchant account, a merchant registration request to register the merchant account for processing payment transactions using fund transfer, the merchant registration request comprising the merchant identifier;
creating the merchant mandate, the merchant mandate associated with the merchant identifier;
registering the merchant mandate with the electronic payment system; and
storing, at the payment network database, the merchant mandate.

13. The method of claim 9, further comprising:
notifying a customer electronic device of a result of the payment transaction request.

14. The method of claim 9 wherein the intermediate account is associated with a payment network server.

15. The method of claim 9 wherein the steps of i) transferring funds from the customer account to the intermediate account and ii) transferring the payment amount being held in the intermediate account to the merchant account are carried out within 10 seconds, 20 seconds, 30 seconds, 1 minute, 5 minutes, 10 minutes, 20 minutes, 30 minutes, 1 hour, 2 hours, 3 hours, 6 hours, 12 hours, or 1 day from a time the payment transaction request is received.

16. A non-transitory computer-readable medium having stored thereon program instructions for processing a payment transaction at a point-of-sale (POS) terminal, the instructions causing at least one processor to:
create a token associated with a client;
receive, from a payment network server, a fund transfer request comprising at least a customer mandate, a merchant mandate, a payment amount, and the token associated with the client provided to the POS terminal from a client device;
query an electronic payment database to determine if the token and the customer mandate are associated with a customer transfer instruction for transferring funds from a customer account to an intermediate account associated with a payment network and if the merchant mandate is associated with a merchant transfer instruction for transferring funds from the intermediate account to a merchant account;

retrieve the customer transfer instruction and the merchant transfer instruction if it is determined that the customer mandate is associated with the customer transfer instruction and the merchant mandate is associated with the merchant transfer instruction respectively;

transfer an incoming fund associated with the payment amount from the customer account to the intermediate account;

hold the payment amount specifically for a merchant in the intermediate account; and transfer the payment amount being held in the intermediate account for the merchant from the intermediate account to the merchant account.

17. The non-transitory computer-readable medium of claim 16, the instructions further causing at least one processor to:

receive, from the payment network server, a customer transfer registration request for creating the customer transfer instruction for transferring funds from the customer account to the intermediate account;

receive, from the payment network server, a merchant transfer registration request for creating the merchant transfer instruction for transferring funds from the intermediate account to the merchant account;

create the customer transfer instruction associated with the customer mandate;

create the merchant transfer instruction associated with the merchant mandate;

transmit, to the payment network server, a customer transfer registration response indicating if the customer transfer instruction is created; and transmit, to the payment network server, a merchant transfer registration response indicating if the merchant transfer instruction is created.

18. The non-transitory computer-readable medium of claim 16, the instructions further causing at least one processor to:

receive, from a customer electronic device, a customer registration request to register the customer account for processing payment transactions using fund transfer, the customer registration request comprising at least a customer identifier;

create the customer mandate associated with the customer identifier;

register the customer mandate with an associated electronic payment system; and store, at a payment network database, the customer mandate.

19. The non-transitory computer-readable medium of claim 16, wherein the instructions are associated with an electronic payment system that facilitates real-time payment.

20. The non-transitory computer-readable medium of claim 16, wherein the token comprises encrypted customer account details that are stored locally on the client device.

* * * * *